US005487139A

United States Patent [19]
Saylor et al.

[11] Patent Number: 5,487,139
[45] Date of Patent: Jan. 23, 1996

[54] METHOD AND SYSTEM FOR GENERATING A RASTER DISPLAY HAVING EXPANDABLE GRAPHIC REPRESENTATIONS

[75] Inventors: Charles H. M. Saylor, Manlius; Vincent N. Cavo, Utica; James A. Riccardi, Jr., Yorkville; Alan T. Piszcz, New York Mills, all of N.Y.

[73] Assignee: Niagara Mohawk Power Corporation, Syracuse, N.Y.

[21] Appl. No.: 758,875

[22] Filed: Sep. 10, 1991

[51] Int. Cl.⁶ .................................................. G06F 15/00
[52] U.S. Cl. ........................................................ 395/135
[58] Field of Search .................................. 395/133, 135, 395/155, 161; 340/747, 750, 732, 734; 345/114, 120, 121, 118

[56] References Cited

U.S. PATENT DOCUMENTS

| | | | |
|---|---|---|---|
| 4,086,632 | 4/1978 | Lions | 364/444 |
| 4,484,192 | 11/1984 | Seitz et al. | 340/995 |
| 4,660,037 | 4/1987 | Nakamura | 340/990 |
| 4,816,208 | 3/1989 | Woods et al. | 376/259 |
| 4,843,569 | 6/1989 | Sawada et al. | 395/133 |
| 4,870,406 | 9/1989 | Gupta et al. | 340/70 |
| 4,916,624 | 4/1990 | Collins et al. | 364/470 |
| 4,916,634 | 4/1990 | Collins et al. | 364/513 |
| 4,926,344 | 5/1990 | Collins et al. | 364/513 |
| 4,970,682 | 11/1990 | Beckwith, Jr. et al. | 364/900 |

OTHER PUBLICATIONS

InFoCAD™, "A Superset of DiGiCAD with DiGiLAND for GIS Applications." Digital Matrix Services, Inc., 1988.
"Digital Matrix Services Maps Out A Solution for C. H. Fenstermaker & Associates," Issue 10, View (A Data General Quarterly) pp. 18 & 19, 1989.
"DiGiCAD™/InFoCAD™ Digital Matrix Services, Inc.," F–M Automation Newsletter, pp. 2–8, Oct., 1988.
"ARC/INFO Image Integrator, Another Step Forward in GIS Technology". . ., Environmental Systems Research Institute, Inc., 1990.
"Integration of Geographic Information Technologies, Arc News," Environmental Systems Research Institute, Inc., vol. 11, No. 1, 1989.

*Primary Examiner*—Phu K. Nguyen
*Attorney, Agent, or Firm*—Heslin & Rothenberg

[57] ABSTRACT

A vector database is used to create a vector map which is aligned with a raster map produced from an existing hand-drawn map. The aligned maps provide an X,Y coordinate basis for the locating of specific addresses within the territory represented by the raster map. The technique is particularly applicable to use by a utility company wherein the addresses identified are customer residences, each residence being coded with specific X,Y coordinates relative to the vector database. Relevant additional customer information is indexed through a graphical representation of the address which when displayed appears on the raster map at the appropriate X,Y coordinates relative to the vector map. Additional specific details of the method and system are presented.

21 Claims, 4 Drawing Sheets fig. 2 fig. 3 fig. 4

METHOD AND SYSTEM FOR GENERATING A RASTER DISPLAY HAVING EXPANDABLE GRAPHIC REPRESENTATIONS

BACKGROUND OF THE INVENTION

1. Technical Field

This invention relates in general to visual display of information and, more particularly, to a method and system for adapting existing drawings and related information for intelligent display on a graphics display monitor or other viewing means.

2. Description of the Prior Art

One important application for intelligent visual display of information is in the display of cartographic drawings. For example, in many utility industries easy reference to cartographic drawings can be critical at certain times, such as during a storm induced power outage. As a more specific example, today in the electrical power industry a company will typically have a regional coordination center for handling service interruptions/disturbances in the distribution network. During a thunderstorm or other type of disturbance inducing event, the coordination center will operate as a hub from which service crews are dispatched, primarily in response to customer service calls received either at the coordination center or at a location remote therefrom and forwarded to the coordination center. In most cases, the coordination center will possess many distribution maps of the particular region of responsibility. These distribution maps may be large, extending for example from floor to ceiling and wall to wall.

During a storm, information on each service outage or other serviceable event (i.e., any disturbance in the distribution network) is transferred to the coordination center (e.g., via a communication link with a printer located within the room which prints out a line failure report containing relevant information on the disturbance event, or a physical memo received at the center). Once received, the serviceable event is posted on one of the maps in the room, for example, in the form a colored pin or other type of marker. (Typically, different colors are used to create an approximate chronology of events as a way of sorting a large number of interruptions/disturbances. For example, if a storm begins at 12 P.M., red event markers may be used from 12 P.M.–3 P.M., blue from 3 P.M.–5 P.M., orange from 5 P.M.–5:30 P.M., etc. The length of each interval would depend upon the progress of the storm and the number of service calls received.)

After posting an event marker at an appropriate location on the appropriate map, the corresponding line failure report is usually placed in a bin to await assignment of a repair crew. During heavy storms with significant numbers of power interruptions/disturbances, this tracking system can become unwieldy (if not completely unworkable), irrespective of the number of operators in the coordination center. This is largely because there is no easy connection between a marker on a network wall map and a corresponding line failure report filed in the bin. Consequently, with a large number of service calls, confusion is easily created. At times with a dispatch of a crew, the line failure reports in the bins must be manually searched to locate the appropriate paper record. Prioritization of calls is also often difficult, again, especially if a large number of customer interruption/disturbance calls are received.

One possible solution to the above-noted problems with the existing approach is to computerize coordination center operations by completely digitizing all network maps and combining the digitized maps with relevant customer database information generated by the utility. The problem with this approach, however, is that map digitization can be extremely expensive, since the process is very labor intensive and time consuming. For a typical size utility company, having tens of thousands of distribution maps, the cost of such an approach is prohibitive. Further, creating a digitized map database containing maps of all company territory and facilities would be duplicative of effort already expended by most companies in producing their network drawings. Over the years, most utility companies have compiled thousands of two-dimensional cartographic drawings which show various aspects of their distribution network. Typically, these drawings include a number of different types of maps, such as primary maps, feeder maps, storm maps, etc., all of which are usually hand-drawn. The digitization approach would be unable to take advantage of any of this previous work.

Therefore, a need exists in the industry for a method and system to streamline operation of a utility's coordination center, while still taking advantage of effort already expended in producing maps and other related information.

SUMMARY OF THE INVENTION

Briefly explained, the present invention comprises in a first aspect a method for generating a raster display map having expandable graphic representations. The generating map employs an existing map and an object database containing information on addresses located within the territory represented by the existing map. The generating method includes the steps of: obtaining a raster image of the existing map; providing a vector database having information characteristic to the territory represented by the rasterized map; displaying a vector map from the vector database, the displayed vector map containing information characteristic to the territory depicted in the rasterized map; substantially aligning corresponding areas of the raster map and the vector map; geocoding the object database information with X,Y coordinates relative to the vector database, at least some of the X,Y coordinates identifying locations of addresses within the territory depicted by the aligned raster and vector maps; and displaying the raster map with at least one graphical representation of an address located within the territory represented by the raster map, the graphical representation being expandable to provide object database information on the at least one address.

In a more specific embodiment the generating method includes saving the raster map and the X,Y object database coordinates in a database for subsequent selective display. Using this prestored information, a method for displaying a serviceable event on a rasterized image of a utility network distribution map is also provided. This displaying technique includes the steps of: receiving a customer service call and identifying an address associated with the serviceable event; identifying from the restored database the X,Y coordinates of the address associated with the serviceable event; and displaying the appropriate raster map and a graphical representation of the serviceable event using the X,Y coordinates of the event address.

A system corresponding to the generating and display methods of the present invention is also provided. The system includes rasterization means for obtaining a computerized raster image of the existing map and a first computer storage means for containing a vector database having information characteristic to the territory represented by the rasterized map. A vector map is produced by display means using the vector database. The displayed vector map contains information characteristic to the territory depicted in the rasterized map. Alignment means provide for alignment of corresponding areas of the raster map and the vector map. Geocoding means are provided for assigning X,Y coordinates to the object database information using the vector database. At least some of the X,Y coordinates assigned to the object database information identify addresses within the territory depicted by the aligned raster and vector maps. Lastly, display means are provided for displaying the raster map with a graphical representation of at least one of the addresses, the graphical representation being expandable to provide additional information contained in the object database regarding the address.

A significant feature of both the method and system of the present invention is the provision of a technique for adapting existing, hand-drawn drawings and other pre-existing information for intelligent display in a rasterized form on a graphics monitor or other viewing means. The method and system are particularly applicable to use by a utility company, such as an electrical power company. Addresses located within the area depicted by a rasterized map are graphically represented with each address having a definite X,Y coordinate relative to the displayed raster map. Each graphical representation can be expanded to provide relevant company information maintained on the subject address. The method and system greatly enhance coordinated receiving and prioritization of customer service calls, for example, during a service interruption or other disturbance resulting from a passing storm.

BRIEF DESCRIPTION OF THE DRAWINGS

These and other objects, advantages and features of the present invention will be more readily understood from the following detailed description of certain preferred embodiments thereof, when considered in conjunction with the accompanying drawings in which.

DESCRIPTION OF THE PREFERRED EMBODIMENT

Figure 1:
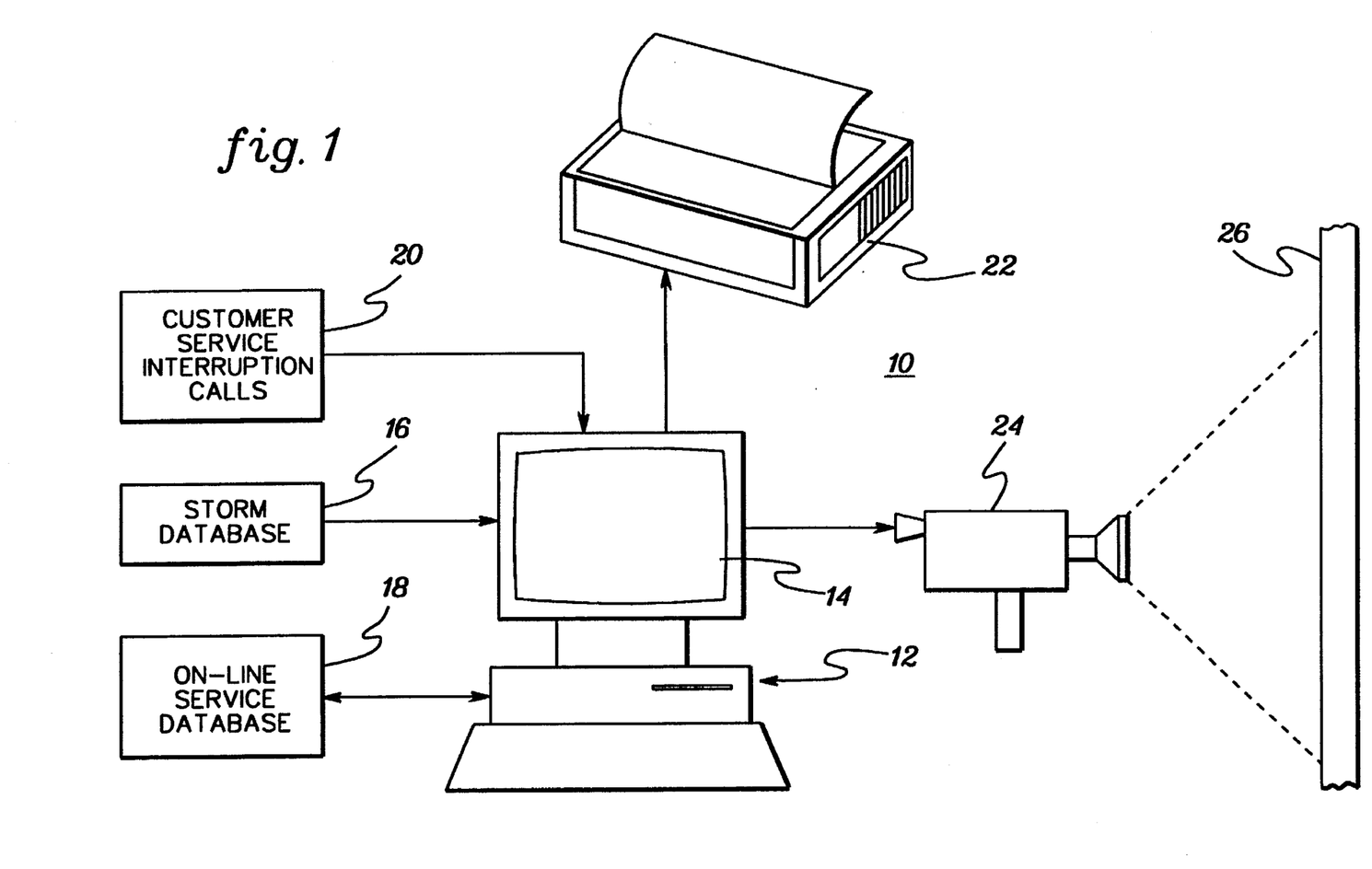
FIG. 1 is a block diagram of one system embodiment of the/present invention.

Pursuant to a first aspect of the present invention, a computerized display system 10 (FIG. 1) is provided for improved utility company management of customer service calls, such as the service interrupt/disturbance calls received by an electrical power company during a storm. In the embodiment of FIG. 1, system 10 includes at least one workstation 12 having a display monitor 14. Workstation 12, which is programmed to accomplish the operations described herein, comprises any one of numerous commercially available such units (e.g., workstations marketed by Data General, Sun Microsystems or IBM could be used).

In a preferred embodiment, workstation 12 is programmed with a commercially available computer aided drafting (CAD) geographical information system (GIS) package having raster/vector overlaying capabilities, such as InFoCAD™ marketed by Digital Matrix Services Inc. (DMS) of Miami, Fla. InFoCAD™ is designed to operate in a mini/mainframe environment and is available on multiple hardware platforms from DEC, Data General, IBM and Sun Microsystems.

Besides raster/vector overlaying capabilities, this multi/simultaneous user software includes CAD capabilities to create nested drawings and maps with graphical tools, complete coordinate geometry features to facilitate the designing and inputting of field and map surveying information for highways, waterways, etc., a graphical relations database system for tracking information contained on maps and drawings, information manipulation capabilities including the ability to zoom and pan maps, and an advanced programmers toolkit which allows users with programming experience to customize the software to particular applications using a high level interface language such as Fortran 77.

As described below, workstation 12 is also programmed to reference a storm database 16 which contains rasterized information of various utility company maps, along with customer records relevant to addresses located therein. A separate on-line service database 18 is also coupled to workstation 12. Database 18 contains a history of service interruption/disturbance calls, which if desired may be compiled in the form of a report and printed in hardcopy format, e.g., from a printer 22 connected to workstation 12. Printer 22, which comprises any one of numerous commercially available such units, also preferably prints out separate "line failure reports" with each interruption/disturbance call 20 received at workstation 12. The communications interface between an incoming service interruption call and workstation 12 can be assembled by one of ordinary skill in the art. By way of example, a fiber optic link could couple a remotely located operator receiving the service calls and the workstation located at a regional coordination center.

In addition to terminal display monitor 14, workstation 12 can be coupled to a video projection unit 24 for enlarged display of information such as network distribution maps. If desired, projection unit 24 could be suspended from a ceiling and positioned to display information substantially on an entire wall of a control room. Such a display approach would be to enhance information viewing by many individuals. Alternatively, multiple workstations could be networked together within the coordination center as needed for multiple simultaneous system access.

Figure 2:
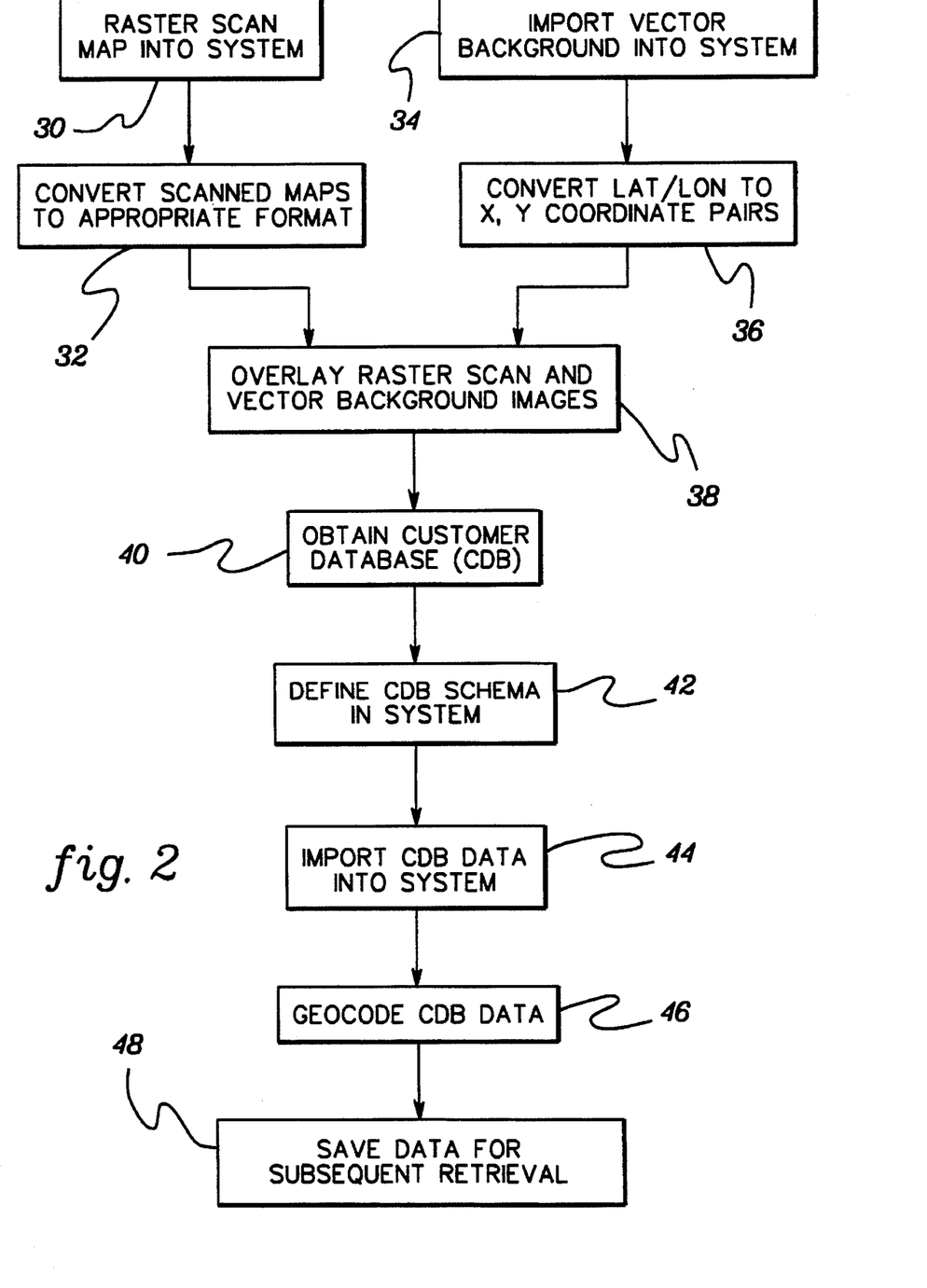
FIG. 2 is a functional flowchart of one data compilation embodiment of the present invention.

FIG. 2 depicts a general overview of one approach to construction of a storm database pursuant to the present invention.

First, if not already rasterized, an existing cartographic drawing must be scanned into the system, 30 "Raster Scan Map Into System." Various raster scanning software and hardware equipment are available in the open market. Utilities, such as commercial power companies, typically possess thousands of very detailed, hand-drawn network drawings, each of which normally shows only a certain aspect of the distribution network. These two-dimensional maps, which may be indexed according to U.S. geographical survey zones such as those set up under the State Plane Coordinate System, depict various network levels of company facilities. For example, primary maps, feeder maps, storm maps, etc., may each be used by a utility company to depict various components of the utility's distribution network. Major components in a power distribution network would include electrical distribution lines, transformers, power poles, switch relays, capacitors, etc.

Depending upon the rasterizing system used, it may be necessary to convert raster scanned images into a different format for system manipulation, 32 "Convert Scanned Maps To Appropriate Format." For example, one preferred type of scanning software is marketed as Re:Vision by ABB of Germany. This software has the ability to revise raster images in a CAD-like format. Assuming this software is used, then the raster image will need to be converted from ABB's implementation of CCITT Group 4 format to one of the formats accepted by the system software, which in the embodiment discussed above comprises InFoCAD™. The InFoCAD™ software can support numerous formats, including, GIF and PCX.

Along with raster scanning existing distribution drawings, system 10 will need to receive vector information corresponding to the rasterized maps, 34 "Import Vector Background Into System." One preferred vector background is the TIGER database produced by the United States Census Bureau. This particular vector database, along with providing information on individual names and addresses, provides latitude/longitude identifiers for each vector. Before this information can be accepted into the processing system, however, the latitude/longitude readings must be converted to X,Y coordinate pairs, 36 "Convert Lat/Lon to X,Y Coordinate Pairs." Although this step is straightforward, several companies (such s Digital Matrix Services, Inc. of Miami, Fla.) will contract to perform the service if desired.

Next, the raster scanned images and the vector maps generated from the vector background database (TIGER) are overlayed and aligned, 38 "Overlay Raster Scan and Vector Background Images." This operation can be manually accomplished or, if desired, software can be used to automate the process. Approximations in alignment will be necessary since the raster maps were created from hand-drawn maps. In certain applications, "eyeballing" of the raster image to the vector map may produce a sufficient degree of accuracy for a utility company. However, this approach may result in an unacceptable degree of accuracy for a different utility company.

For example, a fifty to one hundred foot error in location of the raster map relative to the vector map may be acceptable for a power company attempting to identify a house having an interruption in electrical service, but would be unacceptable for a gas company attempting to identify a valve buried beneath ground. If greater accuracy is required, commercially available software can be purchased which will assist in automated rectification of the raster map relative to the vector map. Again, use of rectification software depends upon the particular degree of accuracy required by a given utility company.

After overlaying the images (and performing any necessary rectification) information from the utility's existing customer database is brought into the system, 40 "Obtain Customer Database (CDB)," after which CDB schema is defined in the system, 42 "Define CDB Schema in System" to facilitate importing of the CDB data into the system, 44 "Import CDB Data Into System." The CDB schema is needed for the system to emulate management's existing customer database. For example, a customer name field will be defined (e.g., having 40 characters), along with an address field (having 30 characters), a zone field (having 10 characters), etc. One example of typical customer database information fields for an electrical power utility is set forth in Table 1.

TABLE 1

| CUSTOMER DATABASE (CDB) |
| --- |
| Name |
| Address |
| Zone |
| Service Pole |
| Transformer Pole |
| Meter Location |
| Circuit |
| Phone Number |
| Substation |
| Zone Map |
| Storm Map |

Obviously the type of information in the customer database will vary between types of utility companies, and even between companies in the same utility industry. X,Y coordinates are the link used to tie this imported CDB data to the raster scanned image having vector background aligned thereto. As explained further below, one preferred approach is to define X,Y coordinates for each address in the address field of the CDB schema. Thus, after importing the CDB data, X,Y coordinates for each entry (name/address) are assigned, 46 "Geocode CDB Data," subsequent which the data is saved for latter retrieval, for example, during a storm or other service disturbing event, 48 "Save Data for Subsequent Retrieval."

Figure 3:
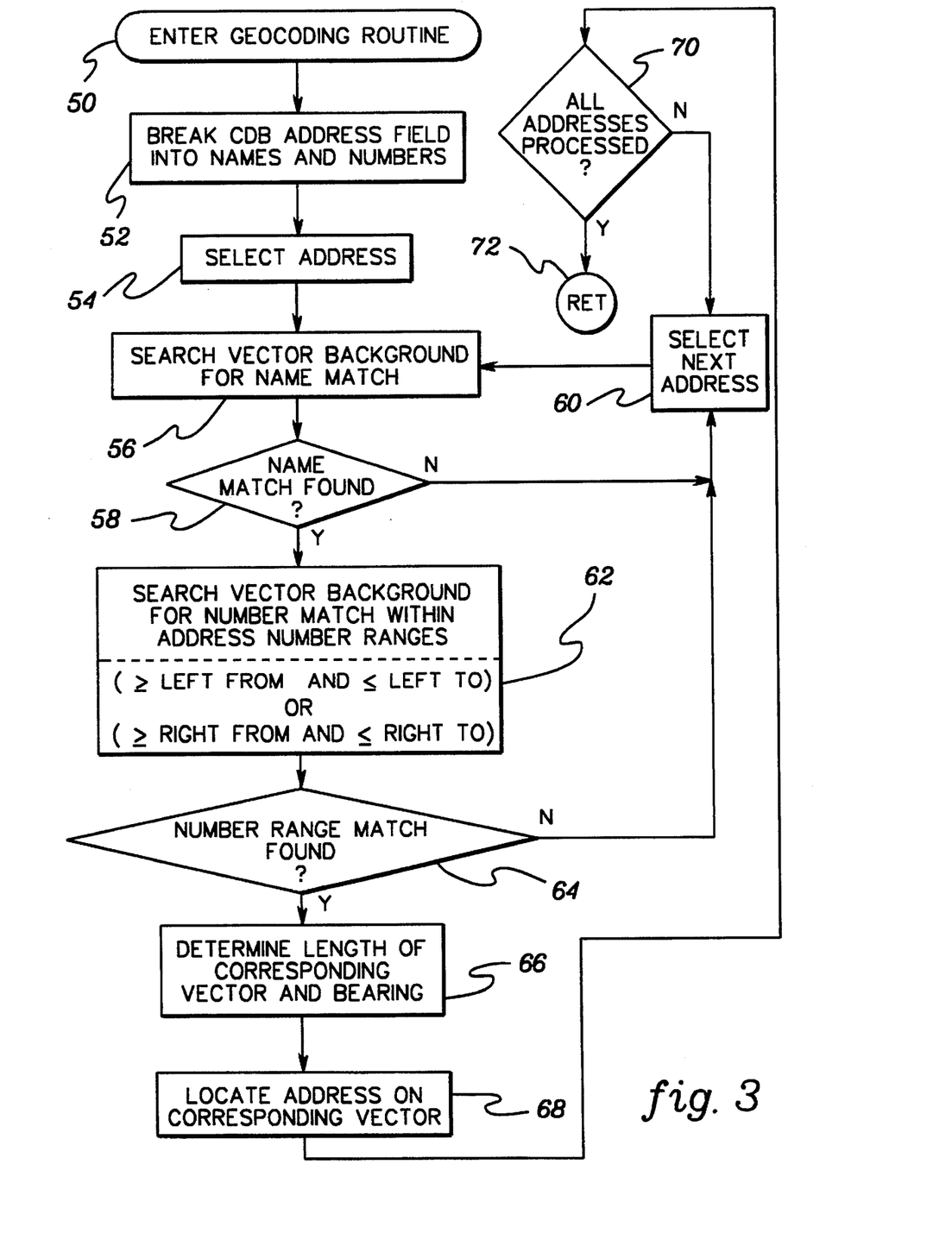
FIG. 3 is a functional flowchart of one geocoding technique useful in the data compilation approach of FIG. 2.

One overview of a geocoding routine pursuant to the present invention is set forth in FIG. 3. After entering the routine, 50 "Enter Geocoding Routine," processing begins by breaking the CDB address field into street names and street numbers, 52 "Break CDB Address Field Into Names and Numbers." An initial address is selected, 54 "Select Address," and a search is begun in the vector background database (TIGER) for a street name match, 56 "Search Vector Background for Name Match." Once completed, inquiry is made as to whether a name match has been found, 58 "Name Match Found?" If not, then the processor is directed to select the next address for name match processing, 60 "Select Next Address," and return to instruction 56. If a name match is identified, the vector background database is searched for a number match within the address number ranges contained therein for the vectors associated with the identified name, 62 "Search Vector Background for Number Match Within Address Number Ranges."

In the converted TIGER vector database, (Step 36, FIG. 2), roadways (and waterways) are represented as vectors with known X,Y terminal coordinates. Table 2 sets forth as an example the terminal address numbers for two imaginary segments of an arbitrary roadway.

TABLE 2

| | From | To |
| --- | --- | --- |
| Left | 100 | 200 |
| Right | 101 | 201 |
| Left | 202 | 402 |
| Right | 203 | 403 |
| . | . | . |
| . | . | . |

Instruction 62 essentially directs the processor to inquire whether the number of the corresponding address is on the left side of the street from 100 to 200 or on the right side of the street from 101 to 201, on the left side of the street from 202 to 402 or on the right side of the street from 203 to 403, etc. (i.e., $\geq$ left from and $\leq$ left to) or ($\geq$ right from and ≦right to). The process determines whether a number range match is found for the street number associated with the given address, 64 "Number Range Match Found?" If not, then the next address is selected for name match processing, 60 "Select Next Address," and return is made to instruction 56. Assuming a number range match is found, the specific location of the subject address is identified on the vector, 66 "Determine Length of Corresponding Vector and Bearing" and 68 "Locate Address on Corresponding Vector." The particular location along the vector of the subject address can be readily determined by one skilled in the art using point/slope geometry. After specifically locating the address (i.e., assigning definite X,Y coordinates), the processor inquires whether all addresses have been processed, 70 "All Addresses Processed?" and if not, then selects the next address (at instruction 60) for processing. After all addresses have been processed, return is made, 72 "RET," to the main loop of FIG. 2.

Figure 4:
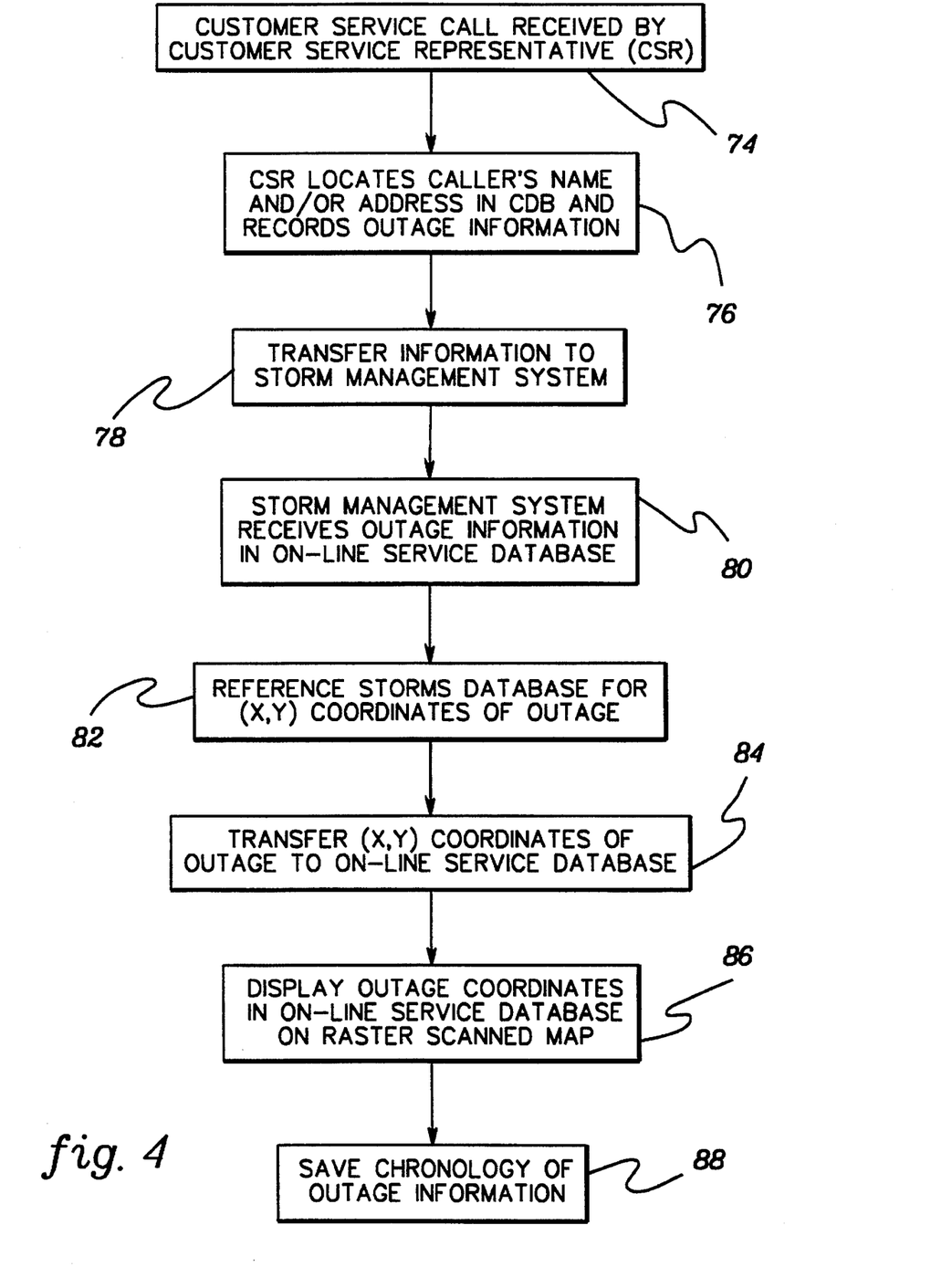
FIG. 4 is one operational overview of the present invention which uses the information compiled during the processing steps of FIGS. 2 & 3.

Once compiled, the storm database is used to greatly enhance control room coordination and response time to service interruption/disturbance calls. FIG. 4 depicts one example of system operation. As already noted, a customer service call is initially received by an operator either at the regional coordination center or at a location remote from the system, 74 "Customer Service Call". A customer service representative (CSR) identifies the caller's name and address in the utility's customer database (CDB) on the corporate mainframe and records any relevant information concerning the service interruption or other type of disturbance (e.g., downed line, arcing wire, emergency, etc.), 76 "CSR Locates Caller's Name and/or Address in CDB and Records Outage Information." This information is then transferred to the storm management system, for example, via an optical fiber link or other communication link, 78 "Transfer Information to Storm Management System." The transferred information is received by the storm management system 10 (FIG. 1) in an on-line service database 18 (FIG. 1), 80 "Storm Management System Receives Outage Information in On-line Service Database."

Thereafter, the storm database 16 (FIG. 1), which contains the information compiled using the techniques set forth in FIGS. 2 & 3, is referenced to obtain the X,Y coordinate information for the disturbance, 82 "Reference Storm Database For (X,Y) Coordinates of Outage." Once obtained, the X,Y coordinates of the service problem are transferred to the on-line service database, 84 "Transfer (X,Y) Coordinates of Outage to On-line Service Database," from which the system can display the location of the interruption/disturbance on display monitor 14 (FIG. 1) and/or wall 26 (via projector 24) so as to appear overlapped on the raster scanned map, 86 "Display Outage Coordinates in On-line Service Database on Raster Scanned Map." As noted, the TIGER vector background need not appear on screen at this stage. Preferably, the processor also will save in on-line service database 18 (FIG. 1) a chronology of the service interruptions/disturbances for the subsequent generation of reports, 88 "Save Chronology of Outage Information." The particular type and format of the reports to be generated can be programmed by one skilled in the art.

It will be observed from the above that the present invention provides a technique for adapting existing, hand-drawn drawings and other pre-existing information for intelligent display in a rasterized form on a graphics monitor or other viewing means. The method and system are particularly applicable to use by a utility company such as an electrical power company. Addresses located within the area depicted by a rasterized map are graphically represented, with each address having a definite X,Y coordinate relative to the displayed raster map (and the underlying vector map). Each graphical representation can be expanded to provide relevant company information maintained on the subject address. The method and system described herein greatly enhance coordinated receiving and prioritization of customer service calls, for example, during a service interruption or other disturbance resulting from a passing storm.

While the invention has been described in detail herein in accordance with several preferred embodiments thereof, certain modifications and changes therein may be affected by those skilled in the art. Accordingly, it is intended by the appended claims to cover all such modifications and changes as fall within the true spirit and scope of the invention.

What is claimed is:

1. A method for generating a raster display map having expandable graphic representations, said generating method employing an existing map and an object database containing information on addresses located within the territory represented by the existing map, said generating method comprising the steps of:

(a) obtaining and displaying a raster map corresponding to said existing map;

(b) providing a preexisting vector database having information characteristic to the territory represented by the raster map;

(c) displaying a vector map from said vector database, said displayed vector map containing said information characteristic to the territory depicted in said raster map;

(d) aligning corresponding areas of said raster map and said vector map;

(e) geocoding said object database information with X,Y coordinates relative to said vector database, at least some of said X,Y coordinates identifying addresses within the areas depicted by said aligned raster and vector maps; and (f) displaying said raster map and a graphical representation of an address located within the area represented by the raster map, said graphical representation being expandable to provide object database information on said address.

2. The generating method of claim 1, wherein said object database information includes an address identification for each address represented therein, and wherein said geocoding step (e) includes assigning X,Y coordinates to said object database information using said address identifications.

3. The generating method of claim 2, wherein each of said address identifications includes a name identification and a number identification and wherein said geocoding step (e) includes the steps of:

(i) separating each of said addresses by name identification and number identification;

(ii) selecting one of the name identifications and searching said vector database for vector matches with said selected name; and (iii) locating a selected address relative to the vectors identified as corresponding to said name identification match using said address number identification.

4. The generating method of claim 3, wherein said vector database comprises a TIGER vector database and said locating step (iii) includes:

searching said TIGER vector database to identify the particular vector having said name identification match and having said corresponding number identification disposed thereon; and locating said selected address along said identified vector.

5. The generating method of claim 4, further comprising the step of converting said TIGER vector database information from Lat/Lon coordinates into X,Y coordinates prior to said geocoding step (e).

6. The generating method of claim 3, further comprising the step of repeating steps (i)–(iii) for each address identification in said object database.

7. The generating method of claim 1, further comprising the step of repeating steps (a)–(f) for a plurality of existing maps.

8. The generating method of claim 1, wherein said existing map comprises a network distribution map for a utility company and said addresses represented in said object database include customer locations, each customer location having an address identification associated therewith.

9. The generating method of claim 1, wherein said obtaining step (a) includes the step of rasterizing said existing map to obtain said raster map.

10. The generating method of claim 1, wherein said displaying step (f) includes displaying said aligned raster and vector maps and a graphical representation of at least one of said addresses located within the areas depicted by said aligned maps.

11. The generating method of claim 10, further comprising the step of removing said vector map from the display of aligned maps such that only the raster map and said graphical representation located therein appear in said display.

12. The generating method of claim 1, further comprising the step of:

(g) saving said raster map and said X,Y object database coordinates in a database for subsequent selective display.

13. The generating method of claim 12, wherein said method is utilized by a utility company for displaying a serviceable event on a rasterized image of a network distribution map, said method further including the steps of:

(h) accomplishing steps (a)–(e) and (g) prior to receiving a customer call on a serviceable event for display;

(i) receiving a customer service call and identifying an address associated with a serviceable event;

(j) identifying from said database the X,Y coordinates of said address associated with said serviceable event; and (k) displaying said raster map and a graphical representation of said serviceable event using the X,Y coordinates of the event address.

14. The generating method of claim 13, wherein said steps (a)–(e) and (g) are accomplished for a plurality of existing maps, and wherein said method includes the step of selecting the appropriate raster map for display, said appropriate raster map having said X,Y coordinates of the event address located thereon.

15. The generating method of claim 13, further comprising the step of expanding said graphical representation of said serviceable event to obtain relevant information thereon from said database saved in step (g).

16. The generating method of claim 13, wherein said displaying step (k) includes displaying said raster map and said graphical representation of said serviceable event on a workstation monitor.

17. The generating method of claim 13, wherein said displaying step (k) includes displaying through a projector said raster map and said graphical representation of said serviceable event.

18. A system for generating a raster display map having expandable graphic representations, said generating system employing an existing territorial map and an object database containing information on addresses located within the territory represented by the existing map, said generating system comprising:

means for rasterizing said existing map to obtain a computerized raster map;

first computer storage means for containing an existing vector database having information characteristic to the territory represented by the rasterized map;

means for displaying a vector map from said vector database, said vector map containing said information characteristic to the territory depicted in the raster map;

means for aligning corresponding territories depicted in said raster map and said vector map;

means for assigning X,Y coordinates to said object database information using said vector database, wherein at least some of said X,Y coordinates assigned to said object database information identify addresses within the territory depicted by said aligned raster and vector maps; and means for displaying said raster map with an appropriately positioned graphical representation of an address located within the territory represented by the raster map.

19. The generating system of claim 18, wherein said object database information includes an address identification for each address represented therein, and wherein said X,Y coordinate assigning means includes means for assigning X,Y coordinates to said object database information using said address address identifications.

20. The generating system of claim 19, wherein each of said address identifications includes a name identification and a number identification and wherein said X,Y coordinate assigning means includes:

means for separating each of said facility addresses by name identification and number identification;

means for selecting one of the name identifications and searching said vector database for vector matches with said selected name; and means for locating the selected address relative to the vectors identified as corresponding to said name identification match using said address number identification.

21. The generating system of claim 20, wherein said existing map comprises a network distribution for a utility company and said addresses represented in said object database comprise customer locations, each customer location having an address identification associated therewith.

* * * * *

UNITED STATES PATENT AND TRADEMARK OFFICE
CERTIFICATE OF CORRECTION

PATENT NO. : 5,487,139
DATED : Jan. 23, 1996
INVENTOR(S) : Saylor et al.

It is certified that error appears in the above-indentified patent and that said Letters Patent is hereby corrected as shown below:

Column 2, line 57, delete "restored" and substitute therefor --prestored--.

Column 3, line 41, between "the" and "present" delete --/--.

Column 10, line 40, delete --address-- (second occurrence).

Column 10, line 45, delete --facility--.

Signed and Sealed this

Eighteenth Day of June, 1996

*Attest:*

BRUCE LEHMAN

*Attesting Officer*     *Commissioner of Patents and Trademarks*